(12) United States Patent
Suematsu et al.

(10) Patent No.: US 11,261,321 B2
(45) Date of Patent: Mar. 1, 2022

(54) GAS BARRIER MATERIAL AND THERMOSETTING RESIN COMPOSITION

(71) Applicant: SEKISUI CHEMICAL CO., LTD., Osaka (JP)

(72) Inventors: Mikitoshi Suematsu, Osaka (JP); Hiroji Fukui, Osaka (JP); Akira Nakasuga, Osaka (JP); Shoji Nozato, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 200 days.

(21) Appl. No.: 16/465,036

(22) PCT Filed: Feb. 27, 2018

(86) PCT No.: PCT/JP2018/007079
§ 371 (c)(1),
(2) Date: May 29, 2019

(87) PCT Pub. No.: WO2018/159566
PCT Pub. Date: Sep. 7, 2018

(65) Prior Publication Data
US 2019/0284389 A1 Sep. 19, 2019

(30) Foreign Application Priority Data

Feb. 28, 2017 (JP) .............................. JP2017-036469
Oct. 18, 2017 (JP) .............................. JP2017-201557

(51) Int. Cl.
| | | |
|---|---|---|
| C08L 63/00 | (2006.01) | |
| C08K 3/04 | (2006.01) | |
| C08K 9/04 | (2006.01) | |
| C01B 32/225 | (2017.01) | |
| C08L 101/00 | (2006.01) | |
| C09D 201/00 | (2006.01) | |

(52) U.S. Cl.
CPC ............ *C08L 63/00* (2013.01); *C01B 32/225* (2017.08); *C08K 3/04* (2013.01); *C08K 9/04* (2013.01); *C08L 101/00* (2013.01); *C09D 201/00* (2013.01); *C08L 2201/14* (2013.01)

(58) Field of Classification Search
CPC .............. C08L 63/00; C08K 3/04; C08K 9/04
USPC ........................................................ 524/495
See application file for complete search history.

(56) References Cited

U.S. PATENT DOCUMENTS

| | | |
|---|---|---|
| 2003/0224877 A1 | 12/2003 | Sullivan et al. |
| 2013/0296498 A1 | 11/2013 | Nakasuga et al. |
| 2013/0316159 A1 * | 11/2013 | Tsumura ............... B32B 27/308 428/216 |
| 2015/0175778 A1 | 6/2015 | Nozato et al. |
| 2017/0066897 A1 * | 3/2017 | Hasegawa ................ C08K 3/04 |
| 2017/0210876 A1 | 7/2017 | Nozato et al. |
| 2021/0193347 A1 | 6/2021 | Maruyama et al. |

FOREIGN PATENT DOCUMENTS

| | | | |
|---|---|---|---|
| EP | 3 081 585 A1 | 10/2016 | |
| EP | 3 089 184 A1 | 11/2016 | |
| EP | 3 382 728 A1 | 10/2018 | |
| JP | 2004-626 A | 1/2004 | |
| JP | 2010-506013 A | 2/2010 | |
| JP | 2012-126827 A | 7/2012 | |
| JP | 5421110 B2 | 2/2014 | |
| TW | 201408595 A | 3/2014 | |
| TW | 201800518 A | 1/2018 | |
| WO | WO-2008/130431 A2 | 10/2008 | |
| WO | WO-2012/105344 A1 | 8/2012 | |
| WO | WO-2014/034156 A1 | 3/2014 | |
| WO | WO-2015181982 A1 * | 12/2015 | ............... C09C 1/44 |
| WO | WO-2016106312 A2 * | 6/2016 | ............... C08J 3/20 |
| WO | WO-2017/090553 A1 | 6/2017 | |
| WO | WO-2018/062285 A1 | 4/2018 | |

OTHER PUBLICATIONS

Debelak, Bryan et al., "Use of exfoliated graphite filler to enhance polymer physical properties", Carbon, Elsevier Oxford, GB, 2007, vol. 45, No. 9, pp. 1727-1734.
Orietta Monticelli et al., "Simple Method for the Preparation of Composites Based on PA6 and Partially Exfoliated Graphite", Journal of Nanomaterials, 2012, vol. 2012, pp. 1-5.
Yan Li et al., "In-situ Exfoliation of Graphene in Epoxy Resins: a Facile Strategy to Efficient and Large Scale Graphene Nanocomposites", ACS Applied Materials & Interfaces, 2016, vol. 8, No. 36, pp. 24112-24122.
Supplementary European Search Report for the Application No. EP 18 760 570.4 dated Nov. 19, 2020.
International Search Report for the Application No. PCT/JP2018/007079 dated Jun. 5, 2018.
Written Opinion of the International Searching Authority (PCT/ISA/237) for Application No. PCT/JP2018/007079 dated Jun. 5, 2018.
Written Opinion of the International Searching Authority (PCT/ISA/237) for Application No. PCT/JP2018/007079 dated Jun. 5, 2018 (English Translation mailed Sep. 12, 2019).
Taiwanese Office Action for the Application No. 107106637 dated Nov. 30, 2021.

\* cited by examiner

*Primary Examiner* — Deve V Hall
(74) *Attorney, Agent, or Firm* — Cheng Law Group, PLLC

(57) ABSTRACT

Provided is a gas barrier material having superior gas barrier properties. This gas barrier material 1 comprises a matrix resin 2, and a carbon material 3 disposed in the matrix resin 2, wherein the carbon material 3 contains a partially exfoliated graphite having a structure in which graphite is partially exfoliated.

9 Claims, 2 Drawing Sheets

[FIG. 1]
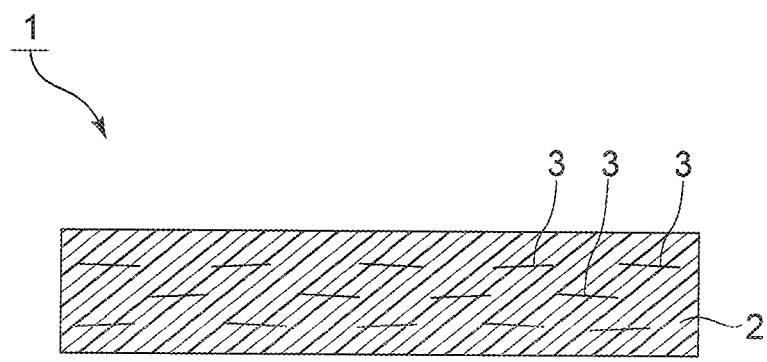
[FIG. 2]
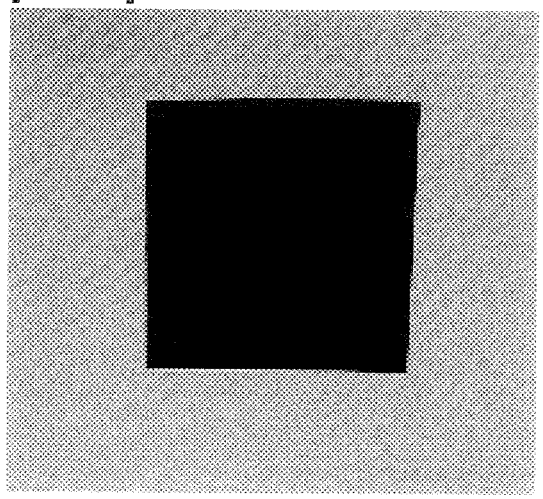
[FIG. 3]
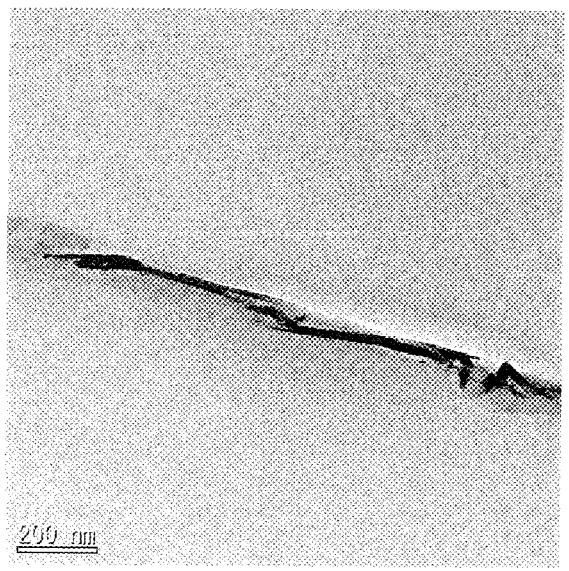

[FIG. 4]
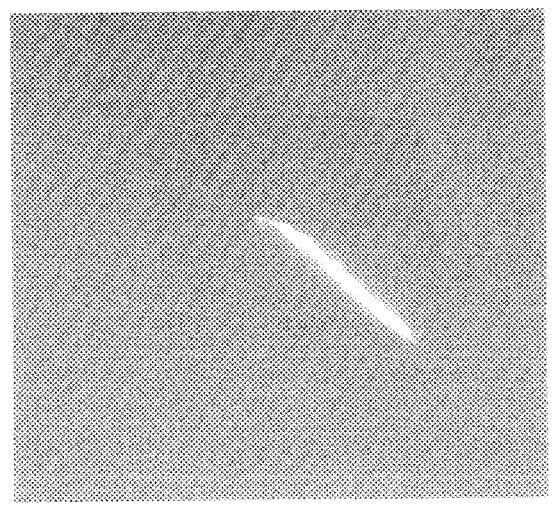
[FIG. 5]
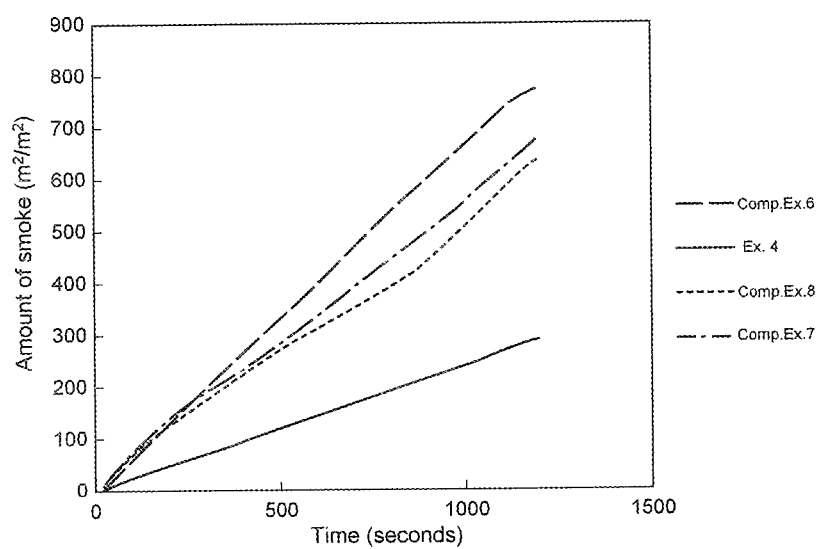

GAS BARRIER MATERIAL AND THERMOSETTING RESIN COMPOSITION

TECHNICAL FIELD

The present invention relates to a gas barrier material and a thermosetting resin composition for use in the gas barrier material, which can suppress the transmission of water vapor and oxygen.

BACKGROUND ART

Conventionally, a gas barrier material capable of suppressing the transmission of water vapor or oxygen has been used in a wide variety of fields such as various packaging materials for food packaging and pharmaceutical packaging, and industrial materials. Such a gas barrier material is usually used in the form of a coating film, a film, or the like. As the gas barrier material, for example, a resin composition comprising a matrix resin and a carbon material disposed in the matrix resin is known.

The following Patent Literature 1 discloses a gas barrier material comprising a polymer matrix and a functional graphene functionalized with a functional group. Patent Literature 1 discloses that the above-described polymer matrix is composed of a thermoplastic resin. Patent Literature 1 discloses that the surface area of the above-described functional graphene is 300 to 2600 $m^2/g$. Patent Literature 1 also discloses that the above-described functional graphene displays no signature of graphite and/or graphite oxide, as determined by X-ray diffraction.

CITATION LIST

Patent Literature

Patent Literature 1
Japanese Patent No. 5421110

SUMMARY OF INVENTION

Technical Problem

However, the gas barrier material obtained by dispersing the functional graphene as in Patent Literature 1 in a thermosetting resin may have insufficient gas barrier properties.

As a result of an intensive investigation into this cause by the present inventors, it has been found that when a thin carbon material such as graphene is added to a thermosetting resin, the carbon material tends to aggregate in the thermosetting resin and thus the carbon material cannot be sufficiently dispersed even in the thermosetting resin thermally cured in this condition, resulting in reduction in the gas barrier properties. Particularly, a liquid thermosetting resin has the following problem: the carbon material is more likely to aggregate, resulting in poor applicability and uneven film formation when applying the liquid thermosetting resin containing the carbon material. Therefore, the gas barrier properties may be further reduced.

The object of the present invention is to provide a gas barrier material and a thermosetting resin composition which are excellent in gas barrier properties.

Solution to Problem

The gas barrier material according to the present invention comprises a matrix resin and a carbon material disposed in the matrix resin. The carbon material includes a partially exfoliated graphite having a structure in which graphite is partially exfoliated. The partially exfoliated graphite is preferably modified with a resin.

In another specific aspect of the gas barrier material according to the present invention, the content of the carbon material in the gas barrier material is 0.1 mass % or more and 10 mass % or less.

In still another specific aspect of the gas barrier material according to the present invention, when y is the amount of methylene blue adsorbed (μmol/g) per g of the carbon material measured based on the difference between the absorbance of a methanol solution of methylene blue having a concentration of 10 mg/L and the absorbance of the supernatant obtained by putting the carbon material into the methanol solution of methylene blue followed by centrifugal separation, and x is the BET specific surface area ($m^2/g$) of the carbon material, the ratio y/x is 0.15 or more and the BET specific surface area of the carbon material is 25 $m^2/g$ or more and 2500 $m^2/g$ or less.

In still another specific aspect of the gas barrier material according to the present invention, the matrix resin comprises a cured thermosetting resin. Preferably, the thermosetting resin is at least one selected from the group consisting of an epoxy resin, a urethane resin, a phenol resin, an unsaturated polyester resin, a polyimide resin, a melamine resin, a urea resin, a silicon resin, a benzoxazine resin, and an acrylic resin. Depending on the use and usage, a plurality of thermosetting resins may be used in combination.

In still another specific aspect of the gas barrier material according to the present invention, the matrix resin comprises the thermoplastic resin. Preferably, the thermoplastic resin is at least one selected from the group consisting of polyethylene terephthalate, polyethylene, polypropylene, a polyamide resin, polybutylene terephthalate, polyvinyl alcohol, an ethylene-vinyl alcohol copolymer resin, a polyvinyl formal resin, a polyvinyl butyral resin, polycarbonate, polyvinyl chloride, and polyvinylidene chloride.

In still another specific aspect of the gas barrier material according to the present invention, the visible light transmittance of the gas barrier material is 5% or less.

The thermosetting resin composition according to the present invention is a thermosetting resin composition for use in the gas barrier material and comprises a liquid matrix resin and the carbon material disposed in the liquid matrix resin, wherein the liquid matrix resin is composed of an uncured thermosetting resin and the carbon material includes the partially exfoliated graphite having the structure in which graphite is partially exfoliated. The partially exfoliated graphite is preferably modified with the resin.

Advantageous Effects of Invention

The present invention can provide a gas barrier material having superior gas barrier properties. The gas barrier material of the present invention can enhance gas barrier properties by using either a thermosetting resin or a thermoplastic resin as a matrix resin. Use of the thermosetting resin as the matrix resin can more effectively enhance gas barrier properties.

BRIEF DESCRIPTION OF THE DRAWINGS

FIG. 1 is a schematic cross-sectional view showing a gas barrier material according to one embodiment of the present invention.

FIG. 2 is a photograph of the barrier material layer side of the film obtained in Example 1.

FIG. 3 is a TEM photograph at a magnification of 15000 times in the cross section of the barrier material layer of the film obtained in Example 1.

FIG. 4 is a photograph of the barrier material layer side of the film obtained in Comparative Example 1.

FIG. 5 is a graph showing the results of the smoke generation test in Example 4 and Comparative Examples 6 to 8.

DESCRIPTION OF EMBODIMENTS

Hereinafter, the present invention will be described in detail with reference to the drawings.

Gas Barrier Material

FIG. 1 is a schematic cross-sectional view showing a gas barrier material according to one embodiment of the present invention. As shown in FIG. 1, the gas barrier material 1 comprises the matrix resin 2 and the carbon material 3. The carbon material 3 is disposed in the matrix resin 2. More specifically, in the present embodiment, the carbon material 3 is dispersed in the matrix resin 2. In the present embodiment, the matrix resin 2 is composed of a cured thermosetting resin. The carbon material 3 is a partially exfoliated graphite having the structure in which graphite is partially exfoliated. The above partially exfoliated graphite is preferably modified with a resin. In this case, the partially exfoliated graphite may be modified by grafting the resin to the partially exfoliated graphite or may be modified by adsorption of the resin to the partially exfoliated graphite.

The above-described resin modifying the partially exfoliated graphite refers to a resin which does not elute in a solvent when the partially exfoliated graphite is washed with the solvent capable of dissolving the resin. To determine whether the partially exfoliated graphite is modified with the resin or not, the sample of the carbon material 3 washed with the solvent capable of dissolving the resin used for modification is thermal analytical measuring, for example, in a temperature range of 30 to 1000° C. at a heating rate of 10° C./min. When a thermal weight change corresponding to the combustion of the resin is found from the result of the differential thermal analysis, the partially exfoliated graphite can be judged to be modified with the resin. The solvent capable of dissolving the resin used for modification can be appropriately selected according to the type of the resin used for modification, and for example, tetrahydrofuran, ethanol, methanol, or toluene can be used.

Examples of a method for modifying the partially exfoliated graphite used in the present invention include a radical grafting reaction, a condensation reaction grafting, an acid-base interaction adsorption, a hydrogen bonding adsorption, and a physical adsorption method of the resin to the partially exfoliated graphite. A suitable modification method may be selected according to the use and usage of the gas barrier material of the present invention.

The gas barrier material 1 of the present embodiment can enhance gas barrier properties such as water vapor and oxygen, since the carbon material 3 containing the partially exfoliated graphite is disposed in the matrix resin 2. Particularly, in the gas barrier material 1, use of the thermosetting resin as the matrix resin 2 can more effectively enhance gas barrier properties. This can be explained as follows.

When the matrix resin 2 is composed of the thermosetting resin as in this embodiment, the matrix resin 2 is formed by thermally curing the liquid thermosetting resin. The liquid thermosetting resin includes not only a thermosetting resin in which the thermosetting resin itself is liquid but also a solid thermosetting resin dissolved in a solvent.

The carbon material is added to and dispersed in this uncured liquid thermosetting resin. However, when conventional thin graphene is used as a carbon material, graphene tends to aggregate in a liquid thermosetting resin and graphene may be insufficiently dispersed. Under the condition that graphene is insufficiently dispersed in the thermosetting resin, the thermosetting resin is thermally cured, and then graphene is not also dispersed in the cured thermosetting resin. As a result, the obtained gas barrier material cannot obtain sufficient gas barrier properties. When the carbon material is insufficiently dispersed in the liquid thermosetting resin, applicability is poor and a film may be formed unevenly. In this case, gas barrier properties become poor. Thus, the conventional gas barrier material has had insufficient gas barrier properties, and improvement in gas barrier properties has required an increase in the amount of the carbon material added. However, a problem of this case is that the pliability and the flexibility of the gas barrier material deteriorates and a crack tends to occur.

On the other hand, the gas barrier material 1 of the present embodiment can enhance the dispersibility of the carbon material 3 in the liquid thermosetting resin, since the above partially exfoliated graphite is used as the carbon material 3. Therefore, the dispersibility of the carbon material 3 in the obtained gas barrier material 1 can be improved and gas barrier properties can be improved. Since the dispersibility of the carbon material 3 in the liquid thermosetting resin is enhanced, applicability is good and a film can be formed evenly. This improves the gas barrier properties of the gas barrier material 1. Particularly, in the gas barrier material 1, when a partially exfoliated graphite is modified with a resin, the dispersibility of the carbon material 3 can be further enhanced and the gas barrier properties can be further improved.

The gas barrier material 1 of the present embodiment thus improves the barrier properties of gas such as water vapor and oxygen, Particularly, the enhanced barrier properties of oxygen can also improve rust prevention.

In the gas barrier material 1 of the present embodiment, the enhanced gas barrier properties can also reduce the amount of the carbon material added. The gas barrier material 1 can improve not only gas barrier properties but also pliability and flexibility. The gas barrier material 1 can be suitably used in the form of a film or a coating film.

In the present invention, the content of the carbon material 3 in the gas barrier material 1 is preferably 0.1 mass % or more, more preferably 0.5 mass % or more, preferably 10 mass % or less, more preferably 5 mass % or less. When the content of the carbon material 3 is the above lower limits or more, gas barrier properties can be further improved. When the content of the carbon material 3 is the above upper limits or less, the pliability and the flexibility of the gas barrier material 1 can be further enhanced. The content of the carbon material 3 is a content when the gas barrier material 1 is taken as 100 mass %.

In the present invention, the density of the thermosetting resin constituting the matrix resin 2 is preferably 0.9 g/cm$^3$ or more, more preferably 1.0 g/cm$^3$ or more, and preferably g/cm$^3$ or less, more preferably 1.6 g/cm$^3$ or less.

When the density of the thermosetting resin is the above lower limits or more, the gas barrier properties of the gas barrier material 1 can be further improved. When the density of the thermosetting resin is the above upper limits or less, the pliability and the flexibility of the gas barrier material 1 can be further enhanced.

In the present invention, examples of the thermosetting resin constituting the matrix resin 2 include a cured epoxy resin, a urethane resin, a phenol resin, an unsaturated polyester resin, a polyimide resin, a melamine resin, a urea resin, a silicon resin, a benzoxazine resin, or an acrylic resin. These resins may be used singly or in combination of two or more.

In the present invention, the visible light transmittance of the gas barrier material 1 is preferably 5% or less, more preferably 1% or less. When the visible light transmittance of the gas barrier material 1 is the above upper limits or less, the gas barrier properties of the gas barrier material 1 can be further improved. Although the reason for this is not clear, it is considered that the visible light transmittance is the above upper limits or less, significantly reducing the number of paths of light having its wavelength larger than visible light and further improving the gas barrier properties.

In the gas barrier material 1, the matrix resin 2 is composed of a cured thermosetting resin. However, in the present invention, the matrix resin 2 may be composed of a thermoplastic resin. Even in this case, the gas barrier properties of the gas barrier material 1 can be improved.

Method for Manufacturing Gas Barrier Material

Hereinafter, an example of a method for manufacturing the gas barrier material 1 will be described in more detail.

An uncured thermosetting resin and the carbon material 3 are prepared. The above uncured thermosetting resin is a resin constituting the matrix resin 2 by thermal curing. The above thermosetting resin is desirable to be liquid. The above uncured thermosetting resin may be solid, and in this case, this resin is desirable to be dispersed in a solvent. As the carbon material 3, a partially exfoliated graphite modified with a resin can be suitably used.

Subsequently, the carbon material 3 is added to the above uncured thermosetting resin and dispersed in the above uncured thermosetting resin. The carbon material 3 may be added in the above uncured thermosetting resin that is dissolved in a solvent. In a liquid thermosetting resin, the carbon material 3 may be added to the liquid thermosetting resin without using a solvent.

The method for dispersing the carbon material 3 is not particularly limited, but examples thereof include a stirring method using ultrasonic irradiation, a jet mill, a stirring planetary stirrer, a disperser, a ball mill, a bead mill, a triple roll, a twin roll, a Henschel mixer, a planetary mixer, a kneader, an automatic mortar, a melt extruder, or the like. Warming and cooling may be performed as appropriate, and pressurization and depressurization may be performed.

The above uncured thermosetting resin is thermally cured by heating the above uncured thermosetting resin in which the carbon material 3 is dispersed. Thereby, the matrix resin 2 is formed, and the gas barrier material 1 in which the carbon material 3 is dispersed in the matrix resin 2 can be obtained. The heating temperature during the above thermal curing can be, for example, 25 to 250° C. The heating time during the above thermal curing can be, for example, 1 to 360 minutes.

In the manufacturing method of the present embodiment, use of the above partially exfoliated graphite as the carbon material 3 can enhance the dispersibility of the carbon material 3 in the uncured thermosetting resin. In the matrix resin 2 of the obtained gas barrier material 1, the dispersibility of the carbon material 3 can be enhanced and the gas barrier properties of the gas barrier material 1 can be improved. Particularly, in the present invention, use of a partially exfoliated graphite modified with a resin as the carbon material 3 can further enhance the dispersibility and further improve the gas barrier properties.

When the gas barrier material 1 is used as a film or a coating film, for example, the thermosetting resin is cured under the condition that the above liquid thermosetting resin is applied to a substrate to form a film. As described above, in the present embodiment, the dispersibility of the carbon material 3 in the liquid thermosetting resin is enhanced, allowing for good applicability and even film formation. This can improve the gas barrier properties of the obtained gas barrier material 1.

Thermosetting Resin Composition

The thermosetting resin composition of the present invention comprises a liquid matrix resin and a carbon material. The carbon material is disposed in the liquid matrix resin. More specifically, in the present embodiment, the carbon material is dispersed in the liquid matrix resin. The liquid matrix resin is composed of an uncured thermosetting resin. The above carbon material includes a partially exfoliated graphite having a structure in which graphite is partially exfoliated. Partially exfoliated graphite is preferably modified with a resin.

In the thermosetting resin composition of the present invention, since the carbon material contains the above partially exfoliated graphite as described above, the dispersibility of the carbon material in the liquid matrix resin in which the carbon material tends to be aggregated is enhanced. Particularly, the carbon material contains a partially exfoliated graphite modified with a resin, allowing to further enhance the dispersibility of the carbon material.

The thermosetting resin composition of the present invention is used as a gas barrier material. The gas barrier material can be obtained by thermally curing the thermosetting resin in the thermosetting resin composition of the present invention. Particularly, in the above thermosetting resin composition, since the dispersibility of the carbon material is enhanced, the dispersibility of the carbon material can be enhanced also under the condition that the gas barrier material is thermally cured. Therefore, use of the thermosetting resin composition of the present invention can improve the gas barrier properties of the obtained gas barrier material.

In the thermosetting resin composition of the present invention, the dispersibility of the carbon material in the liquid matrix resin is enhanced, allowing for good applicability and even film formation. This can improve the gas barrier properties of the obtained gas barrier material.

Details of Material

Hereinafter, details of the material constituting the gas barrier material and the thermosetting resin composition of the present invention will be described.

Thermosetting Resin

The thermosetting resin is not particularly limited, and examples thereof include an acrylic resin, an amino resin, a phenol resin, a thermosetting urethane resin, an epoxy resin, a thermosetting polyimide resin, an aminoalkyd resin, a urea resin, a benzoxazine resin, a silicon resin, and an unsaturated polyester resin. These resins may be used singly or in combination of two or more. Examples of the above amino resin include a urea resin or a melamine resin. The above thermosetting resin is preferably an epoxy resin.

The above epoxy resin is not particularly limited, and examples thereof include a bisphenol A type epoxy resin, a hydrogenated bis A type phenol resin, a bisphenol F type epoxy resin, a bisphenol S type epoxy resin, a dicyclopentadiene type epoxy resin, a naphthalene type epoxy resin, a CTBN modified epoxy resin, a tetrahydroxyphenyl ethane type epoxy resin, an epoxy group-containing acrylic polymer, an epoxidized rubber, and an epoxidized soybean oil.

Of these, the bisphenol A type epoxy resin and the bisphenol F type epoxy resin are preferable.

The thermosetting resin may be solid or liquid at room temperature. In the case of solid at room temperature, it can be dissolved in a solvent such as xylene or methyl ethyl ketone for use. The thermosetting resin is preferably liquid at room temperature.

The term "liquid at room temperature" means that the viscosity of the thermosetting resin at 25° C. is in the range of 1 to 100000 mPa·s.

In the gas barrier material, the thermally cured thermosetting resin as described above is used for a matrix resin.

A curing agent and a curing accelerator may be used in thermal curing. The curing agent and the curing accelerator are not particularly limited, and examples thereof include Imidazole type curing agents such as 2-ethyl-4-methylimidazole (2E4MZ) and 2-methylimidazole (2MZ); thermally latent curing agents such as onium salt, BF 3-amine complex, and dicyandiamide; polyamine type curing agents such as polyethylene polyamine and metaxylene diamine; acid anhydride type curing agents such as trialkyltetrahydrophthalic anhydride and trimellitic anhydride; chlorine substituted carboxylic acid type curing accelerators such as monochloroacetic acid and dichloroacetic acid; chlorine-substituted phenol type curing accelerators such as p-chlorophenol and o-chlorophenol; nitro-substituted phenol type curing accelerators such as p-nitrophenol; and mercaptan type curing accelerators such as thiophenol and 2-mercaptoethanol. These may be used singly or two or more of them may be used in combination.

Thermoplastic Resin

The thermoplastic resin is not particularly limited, and examples thereof include polyethylene terephthalate, polyethylene, polypropylene, a polyamide resin, polybutylene terephthalate, polyvinyl alcohol, an ethylene-vinyl alcohol copolymer resin, a polyvinyl formal resin, a polyvinyl butyral resin, polycarbonate, polyvinyl chloride, polyvinylidene chloride, and an acrylic resin. These resins may be used singly or in combination of two or more.

Carbon Material

The carbon material includes a partially exfoliated graphite having a structure in which graphite is partially exfoliated. A partially exfoliated graphite is preferably modified with a resin.

The resin for modification is not particularly limited, and examples thereof include a polyether resin such as polypropylene glycol, polyethylene glycol, and polytetramethylene glycol; a polyvinyl resin such as polyglycidyl methacrylate, polyvinyl acetate, polybutyral, polyacrylic acid, polystyrene, poly-α-methylstyrene, polyethylene, polypropylene, and polyisobutylene; or a diene-based resin such as polybutadiene, polyisoprene, and styrene-butadiene rubber. Preferable examples include resins which tend to generate free radicals by thermal decomposition of polypropylene glycol, polyethylene glycol, polyglycidyl methacrylate, and polyvinyl acetate.

The resin for modification which may be used includes a polyester resin, a polyamide resin, a polyimide resin, a polymaleimide resin, a polycarbonate resin, a polylactic acid resin, a urea resin, a polyurethane resin, a phenol resin, a melamine resin, and a polyether ether ketone resin.

Exfoliated graphite is a graphene sheet laminate obtained by exfoliating graphite. The number of laminated graphene sheets in the exfoliated graphite is usually about several to several thousand layers. From the viewpoint of further enhancing the dispersibility in the thermosetting resin, the number of laminated graphene sheets is preferably 1000 or less, more preferably 500 or less.

In the present invention, the above exfoliated graphite is preferably a partially exfoliated graphite having a structure in which graphite is partially exfoliated. In this case, the gas barrier properties of the gas barrier material can be further improved.

More specifically, "graphite is partially exfoliated" means that in the laminate of graphene, the graphene layers are open to a certain extent from the edge, that is, a part of the graphite is exfoliated at the edge and the graphite layer is laminated in the same manner as the original graphite or primary exfoliated graphite in the central part. Therefore, the part where the graphite partially exfoliated at the edge is continuous with the part on the center side.

A partially exfoliated graphite has many portions where graphite is exfoliated. The portion where the above graphite is exfoliated means the portion of the graphite or the primary exfoliated graphite at which the graphene laminate at the edge or graphene is partially exfoliated.

The number of the laminated layers of the graphene sheets in the portion which is exfoliated at the edge of a partially exfoliated graphite is preferably 100 or less, more preferably 50 or less, further preferably 30 or less.

The partially exfoliated graphite has a structure in which graphene is laminated on the center side as with the original graphite or primary exfoliated graphite. Even in the center side portion, the resin may be thermally decomposed so that a portion of the graphene layers extended compared with the original graphite or primary exfoliated graphite may exist.

In the partially exfoliated graphite, thus, the interlayer distance of the graphene layers is extended and the number of laminated graphene in the exfoliated portion at the edge is small, resulting in large specific surface area. Therefore, use of the partially exfoliated graphite can further enhance the dispersibility of the carbon material in the matrix resin.

Such a partially exfoliated graphite can be manufactured, for example, by the same method as the method for manufacturing an exfoliated graphite-resin composite material described in International Publication No. WO 2014/034156. Specifically, the manufacturing method comprises a step of preparing a raw material composition in which the resin is fixed to graphite or primary exfoliated graphite and a step of exfoliating graphite or primary exfoliated graphite while a part of the resin can be remained by thermally decomposing the resin contained in the raw material composition. Examples of means for fixing the resin in the raw material composition include grafting or adsorption.

Graphite is a laminate of a plurality of graphene sheets. The number of laminated layers of graphene sheets in graphite is about 100000 to 1000000. As the graphite, natural graphite, artificial graphite, and expanded graphite can be used. Expanded graphite has larger interlayer spacing between graphene layers than ordinary graphite. Therefore, from the viewpoint of more easily exfoliating graphite, expanded graphite is preferably used as graphite.

The primary exfoliated graphite widely includes exfoliated graphite obtained by exfoliating graphite by various methods. The primary exfoliated graphite may be a partially exfoliated graphite. Since the primary exfoliated graphite is obtained by exfoliating graphite, its specific surface area should be larger than that of graphite.

The heating temperature during the above thermal decomposition is not particularly limited, but it may be, for example, 200° C. or more and 500° C. or less.

The heating time during the above thermal decomposition is preferably 2 hours or more, more preferably 3 hours or more, preferably 12 hours or less, and more preferably 6 hours or less. The heating time is the above lower limits or more, allowing to further enhance the exfoliating degree of the obtained partially exfoliated graphite and further increase the specific surface area. The heating time is the above upper limits or less, allowing to further suppress the restacking of graphite and further increase the specific surface area. The heating time varies depending on the resin used and can be adjusted for each resin used.

The resin in the above raw material composition is not particularly limited as long as the resin is a resin having a radical cleavage site by heating, and it is preferably a resin having a segment composed of a polyvinyl polymer, a polyether segment, polyester, polycarbonate, polyurethane, polyimide, polyimide, and the like, more preferably polymer composed of radical polymerizable monomer. The resin may be a copolymer of plural types of radical polymerizable monomers or may be a homopolymer of one radical polymerizable monomer.

As the resin to be used, examples of a resin having a polyether segment include polypropylene glycol, polyethylene glycol, polytetramethylene glycol, or a block polymer thereof.

Examples of the polymer composed of the radical polymerizable monomer include polyglycidyl methacrylate, polyvinyl acetate, polyvinyl acetate hydrolyzate, polybutyral, polyacrylic acid, polypropylene, polyethylene, poly-α-olefin, polystyrene, or styrene butadiene rubber. More preferred are polypropylene glycol, polyethylene glycol, polyglycidyl methacrylate, polystyrene, or copolymers thereof.

The amount of the resin remaining in a partially exfoliated graphite is preferably 5 to 350 parts by weight, more preferably 15 to 250 parts by weight, and more preferably 20 to 200 parts by weight, per 100 parts by weight of a partially exfoliated graphite. Setting the amount of the resin remaining within the above range can further increase the specific surface area of a partially exfoliated graphite.

In the case of using a composition in which the resin is fixed to graphite or primary exfoliated graphite by grafting as a raw material composition, the resin remaining in the obtained partially exfoliated graphite modifies the partially exfoliated graphite. In this case, the modification step by the resin can be omitted.

In the present invention, the resin remaining in partially exfoliated graphite may be completely removed by thermal decomposition. In this case, the carbon material of the present invention can be obtained by further modifying the obtained partially exfoliated graphite with a resin by a conventionally known method. The partially exfoliated graphite obtained by completely removing the resin remaining by thermal decomposition may be used as it is without being modified with the resin.

In the present invention, the BET specific surface area of the carbon material is preferably 25 $m^2/g$ or more, more preferably 45 $m^2/g$ or more. In this case, the dispersibility of the carbon material in the matrix resin can be further enhanced, and gas barrier properties can be further improved. The BET specific surface area of the carbon material is preferably 2500 $m^2/g$ or less.

In the carbon material used in the present invention, when y is the amount of methylene blue adsorbed (μmol/g) per g of the carbon material and x is the BET specific surface area ($m^2/g$) of the carbon material, the ratio y/x is preferably 0.15 or more. The upper limit of the ratio y/x is not particularly limited, but it can be about 1.0 for example.

The amount of methylene blue adsorbed (μmol/g) is measured as follows. The absorbance (blank) of methanol solution of methylene blue at a concentration of 10 mg/L is measured. The object to be measured (carbon material) is charged into the methanol solution of methylene blue, and the absorbance (sample) of the supernatant obtained by centrifugation is measured. From the difference between the absorbance (blank) and the absorbance (sample), the amount of methylene blue adsorbed (μmol/g) per g is calculated.

There is a correlation between the above amount of methylene blue adsorbed and the specific surface area determined by BET of the carbon material. Conventionally known spherical graphite particles had a relationship of y≈0.13x wherein x was the BET specific surface area ($m^2/g$) and y was the amount of methylene blue adsorbed (mol/g). This indicates that the amount of methylene blue adsorbed increases as the BET specific surface area is larger. Therefore, the amount of methylene blue adsorbed can be an alternative index of the BET specific surface area.

In the present invention, as described above, the ratio y/x of the above carbon material is preferably 0.15 or more. In contrast, conventional spherical graphite particles have the ratio y/x of 0.13. Therefore, when the ratio y/x is 0.15 or more, the amount of methylene blue adsorbed increases despite of the same BET specific surface area as the conventional spherical graphite. In this case, the interlayer distance of the graphene layers or the graphite layers can be further extended in the wet condition such as in methanol as compared with the dry condition, although condensation somewhat occurs in the dry condition. Thus, the dispersibility of the carbon material can be further enhanced particularly in the liquid thermosetting resin. Examples of the carbon material having the ratio y/x of 0.15 or more include the above partially exfoliated graphite.

Other Components

The gas barrier material and the thermosetting resin composition of the present invention may contain other components within a range without inhibiting the effect of the present invention.

Examples of other components include an antioxidant such as phenol type, phosphorus type, amine type or sulfur type; an ultraviolet absorber such as benzotriazole type or hydroxyphenyl triazine type; a metal damage inhibitor; a halogenated flame retardant such as hexabromobiphenyl ether or decabromodiphenyl ether; a flame retardant such as ammonium polyphosphate or trimethyl phosphate; an inorganic fillers such as calcium carbonate, talc, mica, clay, aerosil, silica, aluminum hydroxide, magnesium hydroxide, and silica sand; and an additive such as an antistatic agent, a stabilizer, a pigment, and a dye. These additives may be used singly or in combination of two or more.

The present invention will be described by showing concrete Examples and Comparative Examples of the present invention. The present invention is not limited to the following Examples.

Example 1

Preparation of Carbon Material

Expanded graphite of 10 g, a thermally decomposable foaming agent (ADCA) of 20 g, polypropylene glycol of 200 g and tetrahydrofuran of 200 g were mixed to prepare a raw material composition. As the expanded graphite, trade name "Perma Foil Powder 8F" manufactured by Toyo Carbon Co., Ltd. at BET specific surface area=22 $m^2/g$ was used. As the thermally decomposable foaming agent, trade name "VINYFOR AC #R-K 3" (thermal decomposition temperature 210°

C.) manufactured by Eiwa Kasei Kogyo Co., Ltd. was used. As polypropylene glycol, trade name "SANNIX GP-3000" (average molecular weight=3000) manufactured by Sanyo Chemical Industries, Ltd. was used. Polypropylene glycol (PPG) was adsorbed on the expanded graphite by irradiating the above raw material composition with ultrasonic wave for 5 hours at 100 W and an oscillation frequency of 28 kHz with an ultrasonic treatment device (manufactured by Honda Electronics Co., Ltd.). A composition in which polypropylene glycol was adsorbed on the expanded graphite was thus prepared.

A composition in which polypropylene glycol had been adsorbed on the expanded graphite was molded by the solution casting method and then heated in order of 80° C. for 2 hours, 110° C. for 1 hour, and 150° C. for 1 hour, thereby removing tetrahydrofuran (hereinafter referred to as THF). The composition from which THF had been removed was heat treated at 110° C. for 1 hour and further heated at 230° C. for 2 hours to foam the composition.

The foamed composition was heated at a temperature of 450° C. for 0.5 hour to prepare a carbon material in which a part of polypropylene glycol remained.

A carbon material composed of a partially exfoliated graphite having a structure in which graphite was partially exfoliated was prepared by heating the carbon material at 350° C. for 2.5 hours. In the obtained carbon material, 14% by weight of polypropylene glycol (resin) was contained based on the total weight, and a partially exfoliated graphite was modified with polypropylene glycol (resin). The amount of resin was calculated as the amount of weight reduction in the range of 350 to 600° C. with TG (product number "STA 7300" manufactured by Hitachi High-Tech Science Corporation).

The BET specific surface area of the obtained carbon material was measured using a specific surface area measurement device (product number "ASAP-2000" manufactured by Shimadzu Corporation, nitrogen gas) to obtain 127 m²/g.

The amount of methylene blue adsorbed of the obtained carbon material was measured by the following procedure to obtain 43 μmol/g. The ratio y/x was 0.34 wherein x was the above BET specific surface area and y was the amount of methylene blue adsorbed.

Measurement of the amount of methylene blue adsorbed was carried out as follows. A methanol solution of methylene blue (guaranteed reagent manufactured by Kanto Chemical Co., Inc.) having concentrations of 10 mg/L, 5.0 mg/L, 2.5 mg/L and 1.25 mg/L was prepared in a measuring flask, and each of the absorbance was measured with an ultraviolet-visible spectrophotometer (product number "UV-1600" manufactured by Shimadzu Corporation) and a calibration curve was prepared. Methylene blue 10 mg/L was prepared, and the carbon material (0.005 to 0.05 g, depending on the BET value of the sample) to be measured, the methylene blue solution (10 mg/L, 50 mL), and a stir bar were added in 100 mL of an eggplant flask. After treating with an ultrasonic washing machine (manufactured by AS ONE Corporation) for 15 minutes, it was stirred for 60 minutes in a cooling bath (25° C.) After reaching the adsorption equilibrium, the carbon material and the supernatant were separated by centrifugation, the absorbance of 10 mg/L of the blank methylene blue solution and the absorbance of the supernatant were measured with an ultraviolet-visible spectrophotometer to calculate the difference in absorbance between blank and supernatant.

The amount of decrease in the methylene blue solution concentration was calculated from the difference between the above absorbance and the calibration curve, and the amount of methylene blue adsorbed on the surface of the carbon material to be measured was calculated by the following formula.

The amount adsorbed (μmol/g)={decrease in concentration of methylene blue solution (g/L)×volume of measurement solvent (L)}/{molecular weight of methylene blue (g/μmol)×mass of the carbon material to be measured (g)}    Formula 2 Parts by weight of the obtained carbon material and 100 parts by weight of a liquid epoxy resin (trade name "YL 980" manufactured by Mitsubishi Chemical Corporation) were mixed, and the mixture obtained by being mixed in a three-roll mill (product number "EXAKT 50I" manufactured by EXAKT Technologies, Inc.) and 4 parts by weight of 2-ethyl-4-methylimidazole (trade name "CUREZOL 2E 4 MZ" manufactured by Shikoku Chemicals Corporation) were mixed, ultrasonicated for 60 minutes, and stirred with a revolving automatic stirrer to obtain a thermosetting resin composition.

The obtained thermosetting resin composition was applied to a substrate film made of polyethylene naphthalate (PEN) having a thickness of 18 μm by using an applicator to obtain a resin film having a thickness of 50 μm. The obtained resin film was cured at 80° C. for 60 minutes. The thermosetting resin composition was thus applied and cured to obtain a film provided with a barrier material layer (gas barrier material).

FIG. 2 is a photograph of the barrier material layer side of the obtained film. As shown in FIG. 2, the thermosetting resin composition obtained in Example 1 was found to have good applicability, allowing for even film formation. FIG. 3 is a TEM photograph at a magnification of 15000 times in the cross section of the barrier material layer of the film obtained in Example 1. The TEM photograph was taken using a transmission electron microscope (product number "JEM-2100" manufactured by JEOL Ltd.). As shown in FIG. 3, the carbon material is found to be dispersed in the barrier material layer.

Example 2

A film provided with a barrier material layer (gas barrier material) was obtained in the same manner as in Example 1 except that the amount of a carbon material added that was mixed with a liquid epoxy resin was 0.1 parts by weight.

Comparative Example 1

A film was obtained in the same manner as in Example 1 except that no carbon material was used.

FIG. 4 is a photograph of the barrier material layer side of the obtained film. As shown in FIG. 4, the film of Comparative Example 1 was curled due to shrinkage on curing.

Comparative Example 2

A film was obtained in the same manner as in Example 1 except that 0.1 parts by weight of clay (trade name "Nanomer 1. 28E" manufactured by Aldrich) was used instead of the carbon material.

Evaluation

The films obtained in Examples 1 and 2 and Comparative Examples 1 and 2 were measured for oxygen transmission properties and water vapor transmission properties by the following method.

Oxygen Transmission Properties

With respect to the films obtained in Examples 1 and 2 and Comparative Examples 1 and 2, oxygen transmittance (oxygen transmission properties) was measured under conditions of 23° C. and 0.1% RH by using an oxygen transmission rate measurement device (trade name "mOX-TRAN 2/21 MH" manufactured by MOCON Inc.). RH indicates relative humidity. The oxygen transmittance of the barrier material layer in terms of 25 μm was calculated using the following formulas (1) to (3) by the following method. The results of the oxygen transmittance (oxygen transmission properties) of the barrier material layer in terms of 25 μm are shown in the following Table 1.

The method for calculating oxygen transmittance of barrier material layer in terms of 25 μm:

$$\text{(Total thickness)}/P_{measured\ value} = \text{(PEN thickness)}/P_{PEN} + \text{(Barrier layer thickness)}/P_{barrier\ material\ layer} \quad \text{Formula (1)}$$

$$P_{PEN} = 31.4 cc/(m^2 \cdot 24 hr \cdot atm) \quad \text{Formula (2)}$$

$$P_{barrier\ material\ layer\ in\ terms\ of\ 25\ \mu m} = P_{barrier\ material\ layer} \times \text{(Thickness of barrier material layer)}/25\ \mu m \quad \text{Formula (3)}$$

In Formulas (1) to (3), $P_{measured\ value}$ is the oxygen transmittance of the film measured by the above oxygen transmission rate measurement device, $P_{PEN}$ is the oxygen transmittance of polyethylene naphthalate (PEN) having a thickness of 18 μm measured by the above oxygen transmission rate measurement device, $P_{barrier\ material\ layer}$ is the oxygen transmittance of the barrier material layer, and $P_{barrier\ material\ layer}$ in terms of 25 μm is the oxygen transmittance of the barrier material layer in terms of 25 μm. The above total thickness is the sum of the thickness of PEN and the thickness of the barrier layer.

The oxygen transmittance of the films prepared in Examples 1 and 2 and Comparative Examples 1 and 2 was measured, $1/P_{barrier\ material\ layer}$ was determined using Formulas (1) and (2), and $P_{barrier\ material\ layer}$ in terms of 25 μm which is the oxygen transmittance of the barrier material layer in terms of 25 μm was determined using Formula (3).

Water Vapor Transmission Properties

With respect to the films obtained in Example 1 and Comparative Example 1, water vapor transmittance (water vapor transmission properties) was measured under conditions of 40° C. and 90% RH using a water vapor transmission rate measurement device (trade name "GTR-300 XASC" manufactured by GTR-TEC Corporation). RH indicates relative humidity. The water vapor transmittance of the barrier material layer in terms of 25 μm was determined by using Formulas (1) and (3) used for the above oxygen transmittance and the following Formula (4) by the following method. The results of the water vapor transmittance (water vapor transmission properties) of the barrier material layer in terms of 25 μm are shown in the following Table 1.

$$P_{PEN} = 5.8\ g/(m^2 \cdot 24 hr \cdot atm) \quad \text{Formula (4)}$$

In Formula (4), $P_{PEN}$ is the water vapor transmittance of polyethylene naphthalate (PEN) having a thickness of 18 μm measured by using the above water vapor transmission rate measurement device.

The water vapor transmittance of the films having the barrier material layer prepared in Example 1 and Comparative Example 1 was measured, 1/P barrier material layer was determined using Formulas (1) and (4), and $P_{barrier\ material\ layer\ in\ terms\ of}$ 25 μm which is the water vapor transmittance of the barrier material layer in terms of 25 μm was determined using Formula (3).

TABLE 1

|  | Ex. 1 | Ex. 2 | Comp. Ex. 1 | Comp. Ex. 2 |
|---|---|---|---|---|
| Carbon material (parts by weight) | 2 | 0.1 |  |  |
| Clay (parts by weight) |  |  |  | 0.1 |
| Liquid epoxy resin (parts by weight) | 100 | 100 | 100 | 100 |
| 2-ethyl-4-methylimidazole (parts by weight) | 4 | 4 | 4 | 4 |
| Oxygen transmission properties cc (25 μm)/(m² · 24 hr · atm) | 1.05 | 4.31 | 6.08 | 296.76 |
| Water vapor transmission properties g (25 μm)/(m² · 25 hr · atm) | 4.59 | — | 12.6 | — |

As shown in Table 1, in Examples 1 and 2 using a partially exfoliated graphite in which polypropylene glycol was grafted as a carbon material, it was confirmed that transmission of oxygen and water vapor was suppressed compared with Comparative Example 1 in which no carbon material was used, that is, gas barrier properties were improved.

Example 3

Preparation of Carbon Material

Expanded graphite of 10 g, a thermally decomposable foaming agent (ADCA) of 20 g, polypropylene glycol (trade name "SUNNIX GP-3000" manufactured by Sanyo Chemical Industries, Ltd., average molecular weight=3000) of 200 g, and tetrahydrofuran of 200 g were mixed to prepare a raw material composition. As the expanded graphite, trade name "Perma Foil Powder 8F" manufactured by Toyo Carbon Co., Ltd. (at BET specific surface area=22 m²/g) was used. As the thermally decomposable foaming agent, trade name "VINYFOR AC #R-K 3" (thermal decomposition temperature 210° C.) manufactured by Eiwa Kasei Kogyo Co., Ltd. was used. As polypropylene glycol, trade name "SANNIX GP-3000" (average molecular weight=3000) manufactured by Sanyo Chemical Industries, Ltd. was used. Polypropylene glycol (PPG) was adsorbed on the expanded graphite by irradiating the above raw material composition with ultrasonic wave for 5 hours at 100 W and an oscillation frequency of 28 kHz with an ultrasonic treatment device (manufactured by Honda Electronics Co., Ltd.). A composition in which polypropylene glycol was adsorbed on the expanded graphite was thus prepared.

A composition in which polypropylene glycol was adsorbed on the expanded graphite was molded by the solution casting method and then heated in order of 80° C. for 2 hours, 110° C. for 1 hour, and 150° C. for 1 hour, thereby removing tetrahydrofuran (hereinafter referred to as THF). The composition from which THF had been removed was heat treated at 110° C. for 1 hour and further heated at 230° C. for 2 hours to foam the composition.

The foamed composition was heated at a temperature of 450° C. for 0.5 hour to prepare a carbon material in which a part of polypropylene glycol remained.

The carbon material composed of a partially exfoliated graphite having a structure in which graphite was partially exfoliated was prepared by heating the carbon material at 350° C. for 2.5 hours. In the obtained carbon material, 14% by weight of polypropylene glycol (resin) was contained based on the total weight, and a partially exfoliated graphite was modified with polypropylene glycol (resin). The amount of resin was calculated as the amount of weight reduction in the range of 350 to 600° C. with TG (product number "STA 7300" manufactured by Hitachi High-Tech Science Corporation).

The BET specific surface area of the obtained carbon material was measured using the specific surface area measurement device (product number "ASAP-2000" manufactured by Shimadzu Corporation, nitrogen gas) by the same method as in Example 1 to obtain 127 m$^2$/g.

The amount of methylene blue adsorbed of the obtained carbon material was measured by the same method as in Example 1 to obtain 43 µmol/g. The ratio y/x was 0.34 wherein x was the above BET specific surface area and y was the amount of methylene blue adsorbed.

1 Part by weight of the obtained carbon material and 100 parts by weight of a liquid epoxy resin (trade name "JER 828" manufactured by Mitsubishi Chemical Corporation) were mixed and kneaded with a three-roll mill (product number "EXAKT 50I" manufactured by EXAKT Technologies, Inc.). 42 Parts by weight of Tohmide 245 LP (manufactured by T & K TOKA CO., LTD.) was further mixed and stirred with a revolving automatic stirrer to obtain a thermosetting resin composition.

The obtained thermosetting resin composition was applied to an SPCE cold rolled steel sheet (150 mm×70 mm×1 mm) with a thickness of 100 lam using an applicator to obtain a coated product. The obtained coated product was cured by heating at 25° C. for 24 hours and subsequently at 120° C. for 2 hours. The thermosetting resin composition was thus applied and cured to obtain a coated cured product provided with a barrier material layer (gas barrier material).

Comparative Example 3

A coated cured product was obtained in the same manner as in Example 3 except that no carbon material was used.

Comparative Example 4

A coated cured product was obtained in the same manner as in Example 3 except that untreated expanded graphite (trade name "Perma Foil Powder 8F" manufactured by Toyo Carbon Co., Ltd.) was used as the carbon material.

Comparative Example 5

A coated cured product was obtained in the same manner as in Example 3 except that 1 part by weight of untreated expanded graphite (trade name "Perma Foil Powder 8F" manufactured by Toyo Carbon Co., Ltd.) as a carbon material and 0.03 parts by weight of sodium salt of carboxymethyl cellulose (product number "419303" manufactured by ALDRICH) as a surfactant for dispersion stability improvement were used.

Evaluation

Dispersion Stability

In order to confirm the dispersion stability, a kneaded product of the carbon materials of Example 3, Comparative Example 4, and Comparative Example 5 and an epoxy resin (trade name "JER 828" manufactured by Mitsubishi Chemical Corporation) was left to stand for 2 weeks in an atmosphere of 40° C. and observed.

Rust Prevention Properties

In order to evaluate the rust prevention properties, the coated cured product was provided with cuts and dents (in accordance with JIS Z 2371) and immersed in 25° C. water and 5% saline at 25° C., and the condition thereof was observed. These results are shown in the following Table 2.

TABLE 2

| | Ex. 3 | Comp. Ex. 3 | Comp. Ex. 4 | Comp. Ex. 5 |
|---|---|---|---|---|
| Dispersion stability | Good (uniform dispersion) | — | Poor (precipitation) | Fair (separation) |
| Immersion in water (30 days) | No rust generation | Rust generation | — | Rust generation |
| Immersion in saline (14 days) | No rust generation | Rust generation | — | Rust generation |

From the results in Table 2, it was confirmed that the coated cured product obtained in Example 3 exhibited excellent dispersion stability and rust prevention properties. In Comparative Example 4, the dispersion stability was poor, and an uneven coating film was obtained. In the coated cured products obtained in Comparative Example 3 and Comparative Example 5, rust was generated, and no sufficient rust prevention properties were obtained.

Example 4

Preparation of Carbon Material

The same carbon material as the carbon material prepared in Example 1 was used.

3.2 Parts by weight of the obtained carbon material, 14 parts by weight of Talc (SSS, Japan Talc Co.), and 100 parts by weight of a liquid epoxy resin (trade name "JER 828" manufactured by Mitsubishi Chemical Corporation) were mixed and kneaded with a three-roll mill (product number "EXAKT 50I" manufactured by EXAKT Technologies, Inc.). 42 Parts by weight of Tohmide 245 LP (manufactured by T & K TOKA CO., LTD.) was further mixed and stirred with a revolving automatic stirrer to obtain a thermosetting resin composition.

The obtained thermosetting resin composition was applied on a glass fiber-reinforced urethane (trade name "NEOLUMBER FFU" manufactured by Sekisui Chemical Co., Ltd.) (100 mm×100 mm×24 mm) by using an applicator to obtain a coated product having a thickness of 200 µm. The obtained coated product was cured by heating at 25° C. for 24 hours and subsequently at 120° C. for 2 hours. The thermosetting resin composition was thus coated and cured to obtain a coated cured product provided with a barrier material layer (gas barrier material).

Comparative Example 6

A coated cured product was obtained in the same manner as in Example 4 except that no carbon material and talc was used.

Comparative Example 7

A coated cured product was obtained in the same manner as in Example 4 except that no carbon material was used.

Comparative Example 8

A coated cured product was obtained in the same manner as in Example 4 except that 1.4 parts by weight of untreated expanded graphite (trade name "Perma Foil Powder 8F" manufactured by Toyo Carbon Co., Ltd.) was used as the carbon material.

Evaluation
Smoke Generation Properties

According to the fire preventive and fireproof performance test and evaluation procedure manual (established by the Japan Testing Center for Construction Materials), heating was carried out at 50 kW/m² for 20 minutes, and the amount of smoke generated at that time was measured. The resulting relationship between the heating time and the amount of smoke is shown in FIG. 5.

The results shown in FIG. 5 confirmed that the coated cured product obtained in Example 4 exhibited excellent dispersion stability and excellent smoke reducing effect. The coated cured products obtained in Comparative Examples 6 to 8 allowed to obtain an insufficient smoke reducing effect.

Example 5

Preparation of Carbon Material;
Preparation of Carbon Material;

The same carbon material as the carbon material prepared in Example 1 was used.

1.0 Part by weight of the obtained carbon material and 100 parts by weight of a polyethylene resin (trade name "NUC 0965" manufactured by DOW Corporation) were mixed and kneaded at 160° C. for 5 minutes with a plasto-mill (model number "Labo Plastmill 4M 150" manufactured by Toyo Seiki Seisaku-sho, Ltd.) to obtain a thermoplastic resin composition.

The obtained thermoplastic resin composition was heat-pressed (product number "NSF-37" manufactured by SHINTO Metal Industries Corporation) at 160° C. to obtain a sheet having a thickness of 400 μm.

Comparative Example 9

A sheet was obtained in the same manner as in Example 5 except that no carbon material was used.
Evaluation Oxygen transmission properties were evaluated according to JIS K 7126-1: 2006 "Plastics—Film and sheeting—Determination of gas-transmission rate—Part 1: Differential-pressure method". As the testing machine, a product name "Gas transmission rate measurement device BR-3, BT-3" manufactured by Toyo Seiki Seisakusho was used.

The visible light transmittance at a wavelength of 700 nm was measured with a spectrophotometer (product name "Spectrophotometer U-3900" manufactured by Hitachi, Ltd.) for visible light transmittance. These results are shown in the following Table 3.

TABLE 3

|  | Ex. 5 | Comp. Ex. 9 |
|---|---|---|
| Oxygen transmission properties cc (25 μm)/(m² · 24 hr · atm) | 23.2 | 27.6 |
| Light transmittance at 700 nm (%) | 0.785 | 7.591 |

REFERENCE SIGNS LIST

1: Gas barrier material
2: Matrix resin
3: Carbon material

The invention claimed is:

1. A gas barrier material comprising
a matrix resin and
a carbon material disposed in the matrix resin,
the carbon material comprising a partially exfoliated graphite having a structure in which graphite is partially exfoliated, and
the partially exfoliated graphite being modified with a resin.

2. The gas barrier material according to claim 1, wherein the content of the carbon material in the gas barrier material is 0.1 mass % or more and 10 mass % or less.

3. The gas barrier material according to claim 1, wherein when y is the amount of methylene blue adsorbed (μmol/g) per g of the carbon material measured based on the difference between the absorbance of a methanol solution of methylene blue having a concentration of 10 mg/L and the absorbance of the supernatant obtained by putting the carbon material into the methanol solution of methylene blue followed by centrifugal separation, and x is the BET specific surface area (m²/g) of the carbon material, the ratio y/x is 0.15 or more, and the BET specific surface area of the carbon material is 25 m²/g or more and 2500 m²/g or less.

4. The gas barrier material according to claim 1, wherein the matrix resin comprises a cured thermosetting resin.

5. The gas barrier material according to claim 4, wherein the thermosetting resin is at least one selected from the group consisting of an epoxy resin, a urethane resin, a phenol resin, an unsaturated polyester resin, a polyimide resin, a melamine resin, a urea resin, a silicon resin, a benzoxazine resin, and an acrylic resin.

6. The gas barrier material according to claim 1, wherein the matrix resin comprises a thermoplastic resin.

7. The gas barrier material according to claim 6, wherein the thermoplastic resin is at least one selected from the group consisting of polyethylene terephthalate, polyethylene, polypropylene, a polyamide resin, polybutylene terephthalate, polyvinyl alcohol, an ethylene-vinyl alcohol copolymer resin, a polyvinyl formal resin, a polyvinyl butyral resin, polycarbonate, polyvinyl chloride, and polyvinylidene chloride.

8. The gas barrier material according to claim 1, wherein the visible light transmittance of the gas barrier material is 5% or less.

9. A thermosetting resin composition for use in the gas barrier material, comprising
a liquid matrix resin and
a carbon material disposed in the liquid matrix resin
wherein the liquid matrix resin comprises an uncured thermosetting resin,
the carbon material comprises a partially exfoliated graphite having a structure in which graphite is partially exfoliated, and
the partially exfoliated graphite is modified with the resin.

* * * * *